(12) United States Patent
Vo et al.

(10) Patent No.: US 10,160,903 B2
(45) Date of Patent: Dec. 25, 2018

(54) MULTI-FUNCTIONAL ADDITIVE FOR OIL OR GAS OPERATIONS

(71) Applicant: Halliburton Energy Services, Inc., Houston, TX (US)

(72) Inventors: Loan K. Vo, Houston, TX (US); Philip D. Nguyen, Houston, TX (US); Bradley J. Sparks, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 27 days.

(21) Appl. No.: 15/104,192

(22) PCT Filed: Feb. 19, 2014

(86) PCT No.: PCT/US2014/017215
§ 371 (c)(1),
(2) Date: Jun. 13, 2016

(87) PCT Pub. No.: WO2015/126390
PCT Pub. Date: Aug. 27, 2015

(65) Prior Publication Data
US 2016/0312105 A1 Oct. 27, 2016

(51) Int. Cl.
*E21B 43/26* (2006.01)
*C09K 8/56* (2006.01)
*C09K 8/50* (2006.01)
*C09K 8/502* (2006.01)
*C09K 8/506* (2006.01)
*C09K 8/565* (2006.01)
*C09K 8/575* (2006.01)
*E21B 43/04* (2006.01)
*E21B 43/267* (2006.01)

(52) U.S. Cl.
CPC ............... *C09K 8/56* (2013.01); *C09K 8/50* (2013.01); *C09K 8/502* (2013.01); *C09K 8/506* (2013.01); *C09K 8/565* (2013.01); *C09K 8/575* (2013.01); *E21B 43/04* (2013.01); *E21B 43/26* (2013.01); *E21B 43/267* (2013.01)

(58) Field of Classification Search
None
See application file for complete search history.

(56) References Cited

U.S. PATENT DOCUMENTS

| 6,364,016 | B1 | 4/2002 | Dalrymple et al. |
| 6,476,169 | B1 | 11/2002 | Eoff et al. |
| 6,832,650 | B2 | 12/2004 | Nguyen et al. |
| 6,978,836 | B2 | 12/2005 | Nguyen et al. |
| 7,036,592 | B2 | 5/2006 | Nguyen et al. |
| 7,114,570 | B2 | 10/2006 | Nguyen et al. |
| 8,283,402 | B2 | 10/2012 | Slay et al. |
| 2010/0314114 | A1 | 12/2010 | Moradi-Araghi et al. |
| 2012/0012320 | A1* | 1/2012 | Weaver ............. C09K 8/508 166/305.1 |
| 2012/0279704 | A1* | 11/2012 | Eoff ................. C09K 8/5751 166/280.2 |
| 2014/0027116 | A1* | 1/2014 | Suresh ............... C09K 8/56 166/292 |
| 2014/0096964 | A1* | 4/2014 | Chakraborty ......... B82Y 30/00 166/279 |
| 2014/0284054 | A1* | 9/2014 | Nguyen ............. C09K 8/506 166/295 |

FOREIGN PATENT DOCUMENTS

| WO | 0204784 A2 | 1/2002 |
| WO | 2010089528 A1 | 8/2010 |

OTHER PUBLICATIONS

International Search Report and Written Opinion dated Nov. 26, 2014; International PCT Application No. PCT/US2014/017215.

* cited by examiner

*Primary Examiner* — Angela M DiTrani Leff
(74) *Attorney, Agent, or Firm* — McGuireWoods LLP

(57) ABSTRACT

A method of treating particles of a particle pack located in a subterranean formation comprising: introducing an additive into the subterranean formation, wherein the additive: (i) comes in contact with the particles of the particle pack; (ii) has a chemical attraction to the particles of the particle pack; and (iii) comprises a first functional group, wherein the first functional group is a water-control agent.

15 Claims, No Drawings

MULTI-FUNCTIONAL ADDITIVE FOR OIL OR GAS OPERATIONS

TECHNICAL FIELD

Additives are often used for water control and fines control. Curable resins are used to consolidate particles of a particle pack. An additive possessing dual or multi-functionalities is provided. The additive can be used in oil or gas operations.

DETAILED DESCRIPTION OF THE INVENTION

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string.

A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, and work-over fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

There are primary and remedial wellbore operations in which it is desirable to consolidate particles together. Examples of particles that are commonly consolidated together to form a consolidated pack of particles are proppant, gravel, and formation particles, such as sand and fines. Examples of wellbore operations that commonly use consolidated packs include remedial proppant/gravel treatments, near-wellbore formation sand consolidation treatments for sand control, consolidating-while-drilling target intervals, and plugging-and-abandonment of wellbores in subterranean formations.

Proppant is commonly used in conjunction with hydraulic fracturing operations (fracing operations). A fracturing fluid is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. The newly-created or enhanced fracture will tend to close together after pumping of the fracturing fluid has stopped. To prevent the fracture from closing, a material must be placed in the fracture to keep the fracture propped open. A material used for this purpose is often referred to as a "proppant." The proppant is in the form of solid particles, which can be suspended in the fracturing fluid, carried down hole, and deposited in the fracture as a "proppant pack." The proppant pack props the fracture in an open position while allowing fluid flow through the permeability of the pack.

Gravel is used in gravel packing operations. Gravel packing can be part of sand control techniques that are used to prevent production of particles from the subterranean formation, such as sand and fines. In gravel pack operations, a sand screen is placed in the wellbore and the surrounding annulus packed with prepared gravel of a specific size designed to prevent the passage of formation sand into the production tubing string. The primary objective is to stabilize the formation while causing minimal impairment to well productivity. Formation particles can also build up behind the sand screen to form a pack.

If the particles, such as the proppant or gravel are not held in place, then the particles can flow towards the wellhead during production. This undesirable migration can cause damage to wellbore equipment and potentially a loss of integrity, for example to the fracture or wellbore. Therefore, it is often desirable to coat the particles with a resin to form a consolidated pack. The resin should have an affinity for the particles and should coat the particles. The resin can be a tacky resin that acts as a glue to bind the particles of the pack together. The resin can also be part of a consolidation system that comprises a curable resin and a curable agent. The curable agent causes the curable resin to cure and become hard and solid via a chemical reaction, wherein heat can increase the reaction rate. After the resin cures, the particles of the pack are consolidated. The particles of a consolidated pack can then remain in the desired location either temporarily or permanently.

It is often necessary to perform a water control operation in a wellbore. During production, water from the reservoir may be undesirably produced along with the oil or gas. Water coning can also occur during production. Therefore, a treatment fluid containing a water control agent can be introduced into a wellbore to help control or eliminate produced water. Moreover, it is also often necessary to perform a fines control operation in a wellbore. Formation sand and fines can also be produced along with oil, gas, and/or water from a reservoir. These formation particles can damage wellbore equipment. Therefore, a treatment fluid containing a fines control agent can also be introduced into a wellbore to help control or eliminate production of formation particles.

However, current technology requires separate ingredients and/or separate treatment fluids containing a specific ingredient that must be introduced into the wellbore in order to consolidate a particle pack, control water production, and control formation particle production. Of course, the more ingredients needed and the more different types of treatment fluids needed only adds to the overall cost and time to complete these wellbore operations. Thus, there is a need for improved ingredients that possess a dual- or multi-functionality. The functionalities can be specific for the exact oil or gas operation to be performed and the exact conditions of a wellbore.

It has been discovered that a polyhedral oligomeric silsesquioxane (POSS) compound can be derivatized to provide a dual- or multi-functionality. Some of the advantages to the derivatized POSS compound include: eliminates the need for performing sequential water-control treatments and then consolidating resin treatments or vice versa; overcomes incompatibility issues between additives that are often encountered when performing water-control treatments ahead of the consolidating resin treatments; and reduces or eliminates the shut-in time needed for a consolidating curable resin to completely cure before being able to perform a water-control treatment.

According to an embodiment, a method of treating particles of a particle pack located in a subterranean formation comprises: introducing an additive into the subterranean formation, wherein the additive: (i) comes in contact with the particles of the particle pack; (ii) has a chemical attraction to the particles of the particle pack; and (iii) comprises a first functional group, wherein the first functional group is a water-control agent.

It is to be understood that the discussion of preferred embodiments regarding the treatment fluid or any ingredient in the treatment fluid, is intended to apply to the method and composition embodiments. Any reference to the unit "gallons" means U.S. gallons.

The methods are for treating particles of a particle pack located in a subterranean formation. The particles of the particle pack can be any particles that are commonly consolidated in a subterranean formation. The particles can be proppant, gravel, subterranean formation particles, such as sand and/or fines, or combinations thereof. The subterranean formation can be part of a reservoir or adjacent to a reservoir. The subterranean formation can be penetrated by a wellbore. The particles of the particle pack can also be located within the wellbore, including an annulus of the wellbore.

The methods include introducing an additive into the subterranean formation. The additive can be in liquid form or solid form. The additive can be added to a carrier fluid. Preferably, the additive is miscible or soluble in the carrier fluid. According to an embodiment, the carrier fluid is not water-based. As used herein, the term "water-based" means a solution where an aqueous liquid is the solvent or a heterogeneous fluid where an aqueous liquid is the continuous phase. The additive can also be part of a heterogeneous fluid, wherein the additive can be part of the continuous or dispersed phase. Any carrier fluid that is compatible with the additive and achieves the desired viscosity is suitable for use. Some preferred carrier fluids are those having high flash points (e.g., above about 125° F.-about 52° C.). The carrier fluid can be selected from the group consisting of butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred carrier fluids include aqueous-dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof.

According to an embodiment, the additive is a derivative of a polyhedral oligomeric silsesquioxane (POSS) compound. The additive has a chemical attraction to the particles of the particle pack. The additive can also interact with the surface of the particles of the particle pack. Accordingly, the additive can have a chemical attraction to the particles, and then when in contact with the particles, interact with to coat the surface of at least some of, and preferably all of, the particles. The additive can comprise one or more compounds, such as silicon alkyl oxides ($CH_3OSi$). The compounds can cause the additive to have a chemical attraction to the particles of the particle pack.

The additive comprises a first functional group, wherein the first functional group is a water-control agent. A water-control agent can eliminate or inhibit undesirable migration or flow of water. According to an embodiment, the first functional group is water swellable. As used herein, the term "water swellable" means the ability to trap or absorb water-based fluids and swell. For example, the first functional group can form a network around water molecules to form a cage-like structure surrounding the water. The first functional group can also imbibe the water molecules, thus causing swelling of the first functional group, which results in an increased volume of the first functional group. The first functional group can also form a hydrogel with the water molecules. The water can contain dissolved salts. The first functional group can comprises a hydrophobic portion. The hydrophobic portion can selectively allow a liquid hydrocarbon, such as a produced reservoir fluid, to pass through the additive and not to become trapped by the first functional group. In this manner, a desired fluid can be produced with little to none of an undesirable water-based fluid to be produced. There can be several first functional groups making up the additive. Preferably, the number of first functional groups is sufficient such that the additive achieves the desired amount of water control.

The first functional group can be a polymer. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight ($M_w$) for a copolymer can be expressed as follows:

$$M_w = \Sigma w_x M_x$$

where $w_x$ is the weight fraction of molecules whose weight is $M_x$.

The chain length and/or molecular weight of the first functional group can be selected such that the first functional group provides a desired amount of water control. Generally, the longer the chain length and higher the molecular weight, the greater amount of water control. Without being limited by theory, it is believed that a longer chain length can provide better water control because there is more area to trap the water molecules. According to an embodiment, the first functional group is hydrophobic polymer technology-1 "HPT-1," polyethyleneimine, polyacrylamide, polyacrylate, polymethacrylate, or polymethacrylamide. A representative structure of HPT-1 is shown below.

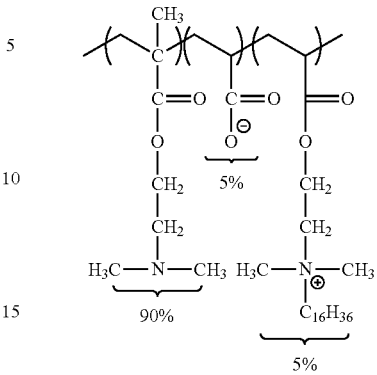

The additive can be a half-caged or full-caged POSS derivative. A half-caged POSS derivative has 4 sites available to bond with functional groups. A full-caged POSS derivative has 8 sites available to bond with functional groups. According to an embodiment, at least two of the sites bond with the first functional group. The additive can also include a second functional group. The second functional group can be a fines control agent or one component of a curable resin consolidation system.

A fines control agent works to eliminate or prevent fines migration. As used herein, "fines migration" means the movement of fine clay, quartz particles, or other similar substances within the subterranean formation due to drag forces during production. As such, the fines control agent helps to prevent movement of formation fines from flowing past the additive. The fines control agent functional group can be long-chained hydrocarbons. As used herein, the term "long-chained hydrocarbons" means a hydrocarbon containing chains having at least 6-28 carbon atoms. The fines control agent can be a tall oil fatty amide, a dimer acid, a trimer acid, or a hydrophobically modified amide, amine or imine. The fines control agent functional group can also contain a hydrophobic portion. The hydrophobic portion can selectively allow a liquid hydrocarbon, such as a produced reservoir fluid, to pass through the additive and not to become trapped. This embodiment may be useful when the water-control functional group does not contain a hydrophobic portion.

The fines control agent functional group can include carbon chain lengths of at least 6 carbon atoms, more preferably, at least 15 carbon atoms. According to an embodiment, the carbon chain length is selected such that the fines control functional group eliminates or reduces the amount of fines migrating or flowing past the additive. Preferably, there is more than one fines control functional group making up the additive. According to an embodiment, there is more than one, and preferably at least 4, carbon chains of the fines control functional groups. The carbon chains can be located close to each other such that the carbon chains form a comb-like filter to trap the fines as they flow past the additive. Preferably, the number of carbon chains of the fines control functional groups and their proximity to one another are selected such that the amount of fines flowing past the additive is reduced or eliminated. Below is one example of a half-caged POSS derivative additive according to one embodiment, showing two water-control functional groups (R) and two fines control functional groups, wherein each fines control functional group includes two carbon chains, making a total of four carbon chains.

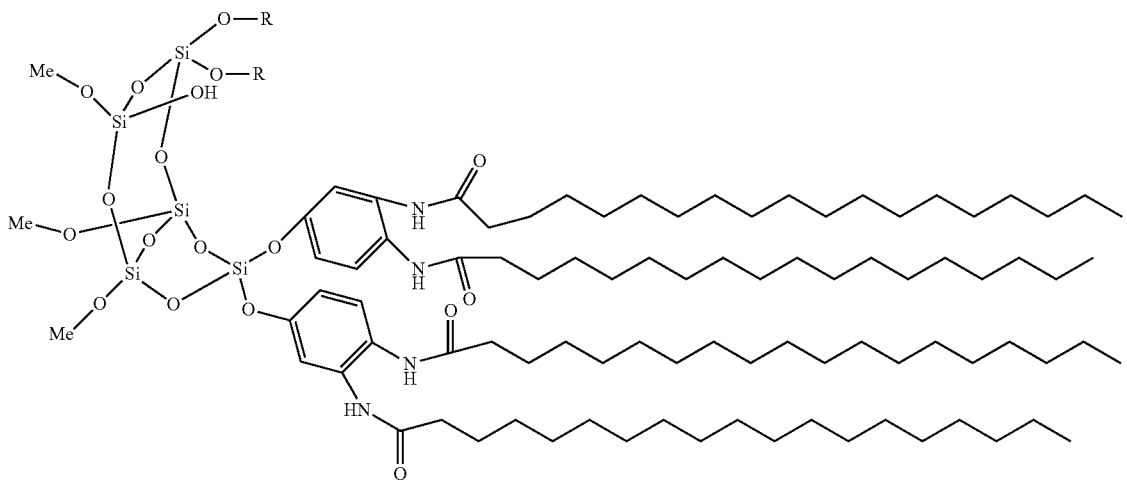

The second functional group can also be one component of a curable resin consolidation system. A curable resin consolidation system generally comprises two components: a curable resin; and a curable agent. The curable resin generally coats the particles of the particle pack and the curable agent causes the curable resin to cure; thus, becoming hard and solid. The curable resin can be selected from the group consisting of polyepoxy, polyisocyanate, polyphenolic, polyester; vinylester, and combinations thereof. The curable agent can be selected from the group consisting of polyalcohol, polyamine, polyimine, polycarboxylate (dimer/trimer acid), and combinations thereof. According to an embodiment, if the functional group of the additive is the curable resin, then the carrier fluid or wellbore fluid contains the curable agent. According to another embodiment, if the functional group of the additive is the curable agent, then the carrier fluid or wellbore fluid contains the curable resin. In this manner, once the additive reaches the particles of the particle pack, the fluid surrounding the particles can contain the other component of the curable resin consolidation system and the curable resin can cure. Of course, the other component of the curable resin consolidation system can also be introduced into the subterranean formation after the additive is introduced and does not have to be already present in the formation. The two components can also be mixed prior to introducing the additive.

According to an embodiment, the additive comprises a third functional group, wherein the second functional group is the fines control agent and the third functional group is one component of the curable resin consolidation system. In this manner, the additive can: 1) be attracted to the particles of the particle pack and optionally coat the particles; 2) function as a water-control agent; 3) function as a fines control agent; and 4) be part of a curable resin system to consolidate the particles of the particle pack.

As mentioned above, a full-caged POSS derivative additive has 8 sites available to bond with the functional groups. The number of sites used for each of the first, second, and/or third functional groups can vary and can be selected based on the desired control. By way of example, if water control is more problematic than fines control, then more of the water-control functional groups can be included in the additive compared to the fines control functional groups, and vice versa.

The additive can be in a sufficient concentration such that one, more than one, or all of the following are achieved (based on the functional groups contained in the additive): the desired amount of water control; the desired amount of fines control; the desired consolidation of the particle pack.

The additive or the carrier fluid can also contain a surfactant. The surfactant can help the additive coat the particles of the particle pack. The surfactant can also cause the additive to flow to the contact points between adjacent coated particles to help begin consolidating the particle pack. The surfactant can be selected from the group consisting of ethoxylated nonyl phenol phosphate ester, mixtures of one or more cationic surfactants, a $C_{12}$-$C_{22}$ alkyl phosphonate surfactant, a mixture of one or more non-ionic surfactants and an alkyl phosphonate surfactant, and combinations thereof.

The additive or the carrier fluid can also include a hydrolysable ester. The hydrolysable ester can help the resin system component coat the particles, and once hydrolyzed, the acid produced can help to clean up any gelled fluids. The hydrolyzable ester comprises at least one of the following: dimethylglutarate, dimethyladipate and dimethylsuccinate, sorbitol, catechol, dimethylthiolate, methyl salicylate, dimethyl salicylate, dimethylsuccinate, ter-butylhydroperoxide, butyl lactate, or mixtures thereof.

The carrier fluid can further include additional additives including, but not limited to, pH buffers, viscosifiers, emulsifiers, weighting agents, fluid loss additives, friction reducers, surface wetting agents, scale inhibitors, catalysts, clay stabilizers, gases, foaming agents, and iron control agents.

Preferably, the additive is thermally stable at the bottomhole temperature of the subterranean formation. As used herein, the term "bottomhole" means the location of the additive in the subterranean formation. If the additive includes the one component of the curable resin consolidation system, then the additive can also be permanent or removable.

The methods include the step of introducing the additive into the subterranean formation, wherein the additive comes in contact with the particles of the particle pack. The additive can be mixed with a carrier fluid prior to introduction. The additive can also be mixed with the particles that will form the particle pack prior to introduction. If the additive includes the one component of the curable resin consolidation system, then the other component of the curable resin consolidation system can be mixed with the additive and optionally the carrier fluid prior to being mixed with the particles or prior to introduction. The particles can also already be located within the subterranean formation prior to introduction of the additive. According to this embodiment, the additive can be pumped into the subterranean formation, and after the additive is located within the subterranean formation, the additive can come in contact with the particles.

The step of introducing can comprise pumping the additive into the subterranean formation. The step of introducing can also include creating or extending one or more fractures in the subterranean formation. The subterranean formation can be penetrated by a well. The well can be, without limitation, an oil, gas, or water production well, an injection well, or a geothermal well. The well can also be an offshore well.

If the additive does not include one component of the curable resin consolidation system, then both components of a curable resin consolidation system can be introduced into the subterranean formation before, during, or after introduction of the additive. The methods can further include causing or allowing the curable resin to cure.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating particles of a particle pack located in a subterranean formation comprising:
   introducing a polymerized additive into the subterranean formation, wherein the additive:
   (i) comes in contact with the particles of the particle pack;
   (ii) has a chemical attraction to the particles of the particle pack;
   (iii) comprises a first functional group, wherein the first functional group is a water-control agent, wherein the first functional group is a polymer, wherein the first functional group is the following structure:

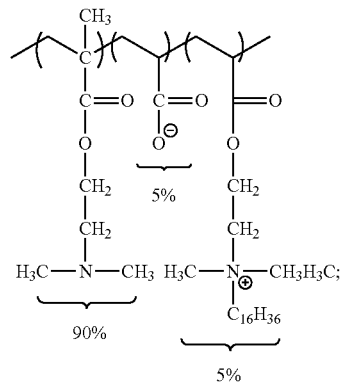

(iv) is a derivative of a polyhedral oligomeric silsesquioxane (POSS) compound; and
   (v) comprises a second functional group that is one component of a curable resin consolidation system comprising at least two components; wherein at least one of the other of the at least two components is present in a carrier fluid.

2. The method according to claim 1, wherein the particles are selected from the group consisting of proppant, gravel, subterranean formation particles, or combinations thereof.

3. The method according to claim 1, wherein the additive is in liquid form or solid form.

4. The method according to claim 1, wherein the additive is added to a carrier fluid.

5. The method according to claim 4, wherein the additive is miscible or soluble in the carrier fluid.

6. The method according to claim 4, wherein the carrier fluid is not water-based.

7. The method according to claim 4, wherein the carrier fluid is selected from the group consisting of butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, methanol, isopropanol, butanol, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof, and combinations thereof.

8. The method according to claim 1, wherein the additive is a half-caged or full-caged POSS derivative.

9. The method according to claim 1, wherein the additive comprises one or more compounds, wherein the compounds cause the additive to have the chemical attraction to the particles of the particle pack.

10. The method according to claim 1, wherein the additive comprises a third functional group, wherein the third functional group is a fines control agent.

11. The method according to claim 10, wherein the fines control agent is a tall oil fatty amide, a dimer acid, a trimer acid, or a hydrophobically modified amide, amine or imine.

12. The method according to claim 11, wherein the fines control agent functional group includes carbon chain lengths of at least 6 carbon atoms.

13. The method according to claim 11, wherein the carbon chain length is selected such that the fines control functional group eliminates or reduces the amount of fines migrating or flowing past the additive.

14. The method according to claim 1, wherein the curable resin consolidation system comprises a curable resin and a curable agent.

15. The method according to claim 1, wherein the step of introducing comprises using one or more pumps.

* * * * *